United States Patent
Jung et al.

(10) Patent No.: US 9,239,481 B2
(45) Date of Patent: Jan. 19, 2016

(54) LIQUID CRYSTAL DISPLAY MODULE AND LIQUID CRYSTAL DISPLAY DEVICE HAVING THE SAME

(71) Applicant: SAMSUNG ELECTRONICS CO., LTD., Gyeonggi-do (KR)

(72) Inventors: Sun Mi Jung, Hwaseong-si (KR); Jeong Il Kang, Yongin-si (KR); Kun Ho Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 191 days.

(21) Appl. No.: 14/016,345

(22) Filed: Sep. 3, 2013

(65) Prior Publication Data
US 2014/0002765 A1   Jan. 2, 2014

Related U.S. Application Data

(63) Continuation of application No. 13/272,551, filed on Oct. 13, 2011, now Pat. No. 8,547,497.

(30) Foreign Application Priority Data

Oct. 13, 2010   (KR) .................. 10-2010-0099779

(51) Int. Cl.
*G02F 1/1333* (2006.01)
*F21V 8/00* (2006.01)
*G02F 1/1335* (2006.01)

(52) U.S. Cl.
CPC .......... *G02F 1/133308* (2013.01); *G02B 6/009* (2013.01); *G02B 6/0068* (2013.01); *G02B 6/0073* (2013.01); *G02F 1/133608* (2013.01); *G02F 2001/133314* (2013.01); *G02F 2201/46* (2013.01)

(58) Field of Classification Search
CPC ........ F21V 7/04; G02F 1/1333; G02F 1/1335
USPC .......................................... 349/58
See application file for complete search history.

(56) References Cited

U.S. PATENT DOCUMENTS

| 6,128,197 | A  | * | 10/2000 | Lebert et al. ................. | 361/752 |
| 6,411,352 | B1 |   | 6/2002  | Kim                            |         |
| 2009/0135332 | A1 | * | 5/2009 | Hahm et al. ................... | 349/61 |

* cited by examiner

*Primary Examiner* — Lucy Chien
(74) *Attorney, Agent, or Firm* — Sughrue Mion, PLLC

(57) ABSTRACT

A liquid crystal display module includes a bottom chassis comprising a lower surface including at least one fastening hole disposed along a first direction; a printed circuit board comprising a first surface supported by the lower surface of the bottom chassis, a second surface opposite to the first surface, and at least one opening hole corresponding to the at least one fastening hole of the bottom chassis; a plurality of light emitting diodes mounted on the second surface of the printed circuit board; and at least one fastening member comprising a head part inserted into the at least one opening hole of the printed circuit board so as not to be protruded outwardly from the second surface of the printed circuit board, and a fastening part disposed in and affixed to the at least one fastening hole.

27 Claims, 6 Drawing Sheets

LIQUID CRYSTAL DISPLAY MODULE AND LIQUID CRYSTAL DISPLAY DEVICE HAVING THE SAME

CROSS-REFERENCE TO RELATED APPLICATION

This is a continuation application of U.S. patent application Ser. No. 13/272,551, filed on Oct. 13, 2011, which claims the benefit of Korean Patent Application No. 2010-0099779, filed on Oct. 13, 2010 in the Korean Intellectual Property Office, the disclosure of which is incorporated in its entirety herein by reference.

BACKGROUND

1. Field

Exemplary embodiments relate to a liquid crystal display module having a structure in which a printed circuit board is connected to a bottom chassis, and a liquid crystal display device having the same.

2. Description of the Related Art

In general, a liquid crystal display (LCD) device displays an image using electrical and optical characteristics of liquid crystals. The LCD device has a thin thickness, a light weight and low power consumption and is operated at low drive voltage, as compared with other display devices, and thus has been widely used in the overall industries.

The LCD device includes a liquid crystal display panel in which liquid crystal molecules are injected into a gap between two transparent substrates and voltage is applied to liquid crystal molecules so as to change orientation of the liquid crystal modules to change light transmittance of the liquid crystal molecules and thus to optically display an image, and a liquid crystal display module to supply light to the liquid crystal display panel.

Recently, an edge type liquid crystal display module using light emitting diodes as a light source unit is mainly used so as to achieve slimness of the LCD device.

The edge type liquid crystal display module is provided with a printed circuit board, on which a plurality of light emitting diodes is mounted. The light emitting diodes are provided on the side surface of the liquid crystal display module, which guides light generated by the light emitting diodes to the front surface of the liquid crystal display module through a light guide plate, and then supplies the light to the liquid crystal display panel.

Such a liquid crystal display module is manufactured through a process of fixing the light source unit. In general, the printed circuit board of the light source unit is assembled with a metal structure having an L shape or other shapes by screws and is then mounted on a bottom chassis.

SUMMARY

An aspect of an exemplary embodiments provides a liquid crystal display module which improves reliability when a printed circuit board is connected to a bottom chassis, and a liquid crystal display device having the same.

Additional aspects of the exemplary embodiments will be set forth in part in the description which follows and, in part, will be obvious from the description, or may be learned by practice of the exemplary embodiments.

An aspect of an exemplary embodiment provides a liquid crystal display module including a bottom chassis including side surfaces and a lower surface provided with at least one fastening hole, a printed circuit board including one surface supported by the lower surface of the bottom chassis and a plurality of light emitting diodes mounted on the other surface opposite to the surface and provided with at least one opening hole corresponding to the at least one fastening hole, at least one fastening member including a head part inserted into the at least one opening hole so as not to be protruded outwardly from the other surface of the printed circuit board, and a screw part fastened into the at least one fastening hole, and at least one support member including a board support part supported by the other surface of the printed circuit board at a position adjacent to the at least one opening hole so as to fix the printed circuit board to the bottom chassis, and a head support part extended from the board support part, interposed between the head part of the at least one fastening member and the lower surface of the bottom chassis and provided with a through hole through which the screw part passes.

The light emitting parts of the plurality of light emitting diodes may be disposed to be vertical with respect to the other surface of the printed circuit board so as to irradiate light in a direction parallel with the lower surface of the bottom chassis.

The liquid crystal display module may further include a light guide unit to guide light emitted from the light emitting parts, and the at least one opening hole may be disposed below the light guide unit.

The plurality of light emitting diodes may be disposed adjacent to the side surfaces of the bottom chassis.

The board support part and the head support part of the at least one support member may be formed such that there is a height difference therebetween and a receipt part to receive the head part may be formed within the at least one support member.

A height of the receipt part may correspond to a thickness of the printed circuit board.

The board support part may have a relatively large diameter, the head support part may have a relatively small diameter, and a connection part to form the inner wall of the receipt part may be formed in a tapered shape, a diameter of which is gradually decreased in a downward direction.

The at least one support member may be fixed to the printed circuit board so as to be provided integrally with the printed circuit board.

The board support part may be soldered to the other surface of the printed circuit board through a surface mount technology (SMT) process.

The at least one support member may be fixed to the at least one fastening member so as to be provided integrally with the at least one fastening member.

The liquid crystal display module may further include a connector protruded from the rear surface of the printed circuit board so as to supply power to the plurality of light emitting diodes, and a connector hole corresponding to the connector may be provided on the lower surface of the bottom chassis.

An aspect of another exemplary embodiment provides a liquid crystal display device including a liquid crystal display panel, a light guide unit to guide light to the liquid crystal display panel, a bottom chassis including side surfaces and a lower surface supporting the light guide unit and provided with at least one fastening hole, a printed circuit board, on which a plurality of light emitting diodes is mounted, disposed below the light guide unit and provided with at least one opening hole corresponding to the at least one fastening hole, at least one fastening member including a head part inserted into the at least one opening hole, and a screw part fastened into the at least one fastening hole, and at least one support member including a receipt part inserted into the at least one opening hole, a board support part extended outwardly from the upper end of the receipt part, and a head support part extended inwardly from the lower end of the receipt part and provided with a through hole through which the screw part passes, wherein the board support part applies pressure to an upper surface of the printed circuit board by the at least one fastening member to fix the printed circuit board to the lower surface of the bottom chassis, and the head part is inserted into the receipt part so as not to be protruded upwardly from the receipt part.

The at least one support member may be fixed to the printed circuit board so as to be provided integrally with the printed circuit board.

The board support part may be soldered to the upper surface of the printed circuit board through an SMT process.

The at least one support member may be fixed to the at least one fastening member so as to be provided integrally with the at least one fastening member.

The board support part may have a relatively large diameter, the head support part may have a relatively small diameter, and a connection part to form the inner wall of the receipt part may be formed in a tapered shape, a diameter of which is gradually decreased in a downward direction.

A height of the receipt part may correspond to a thickness of the printed circuit board.

Light emitting planes of the plurality of light emitting diodes may be disposed to be vertical with respect to the printed circuit board so as to irradiate light onto at least one side surface of the light guide unit.

The plurality of light emitting diodes may be disposed adjacent to the side surfaces of the bottom chassis.

The liquid crystal display device may further include a connector protruded from a rear surface of the printed circuit board so as to supply power to the plurality of light emitting diodes, and a connector hole corresponding to the connector may be provided on the lower surface of the bottom chassis.

The liquid crystal display device may further include a reflective unit disposed on the lower end of the light guide unit, and the reflective unit may be disposed on the lower surface of the bottom chassis so as to cover the at least one opening hole.

An aspect of another exemplary embodiment provides a liquid crystal display module including a bottom chassis including side surfaces and a lower surface provided with at least one fastening hole, a printed circuit board, on which a plurality of light emitting diodes is mounted, provided with at least one opening hole corresponding to the at least one fastening hole, at least one fastening member including a head part, and a screw part fastened into the at least one fastening hole, and at least one support member including a receipt part inserted into the at least one opening hole to receive the head part, and a board support part supported by the printed circuit board, wherein the board support part applies pressure to the printed circuit board by fastening force of the at least one fastening member to fix the printed circuit board to the lower surface of the bottom chassis.

An aspect of another exemplary embodiment provides a liquid crystal display device including a liquid crystal display panel; a light guide unit which guides light to the liquid crystal display panel; a bottom chassis supporting the light guide unit and comprising a lower surface including at least one fastening hole disposed along a first direction; a printed circuit board comprising a first surface supported by the lower surface of the bottom chassis, a second surface opposite to the first surface, and at least one opening hole corresponding to the at least one fastening hole of the bottom chassis; a plurality of light emitting diodes mounted on the second surface of the printed circuit board and positioned outside of the at least one fastening hole; and a reflective unit disposed between the light guide unit and the printed circuit board and overlapping the at least one opening hole.

The head part may not be protruded upwardly from the printed circuit board when the at least fastening member is fastened into the at least one fastening hole.

BRIEF DESCRIPTION OF THE DRAWINGS

These and/or other aspects of the exemplary embodiments will become apparent and more readily appreciated from the following description, taken in conjunction with the accompanying drawings of which.

DETAILED DESCRIPTION

Figure 1:
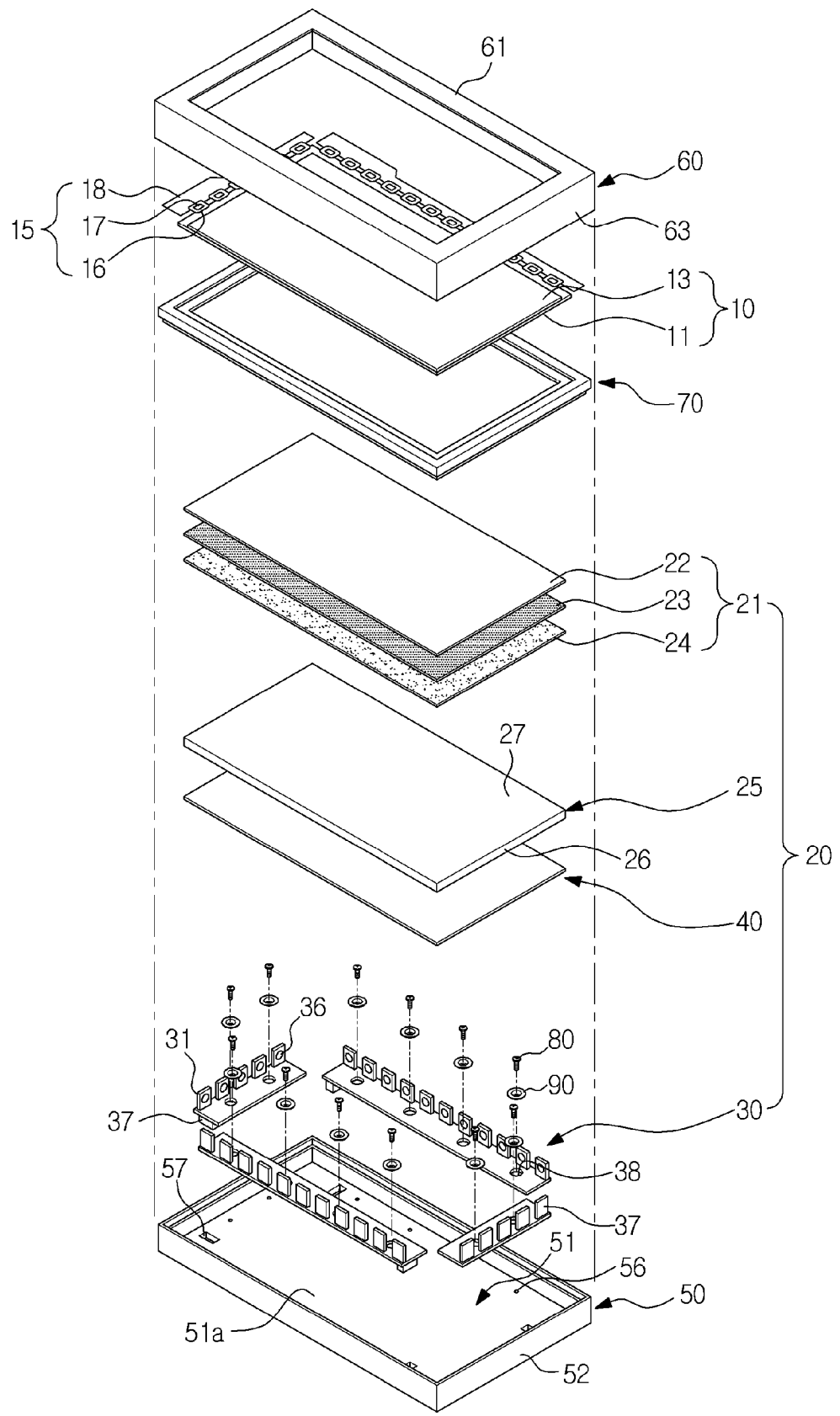
FIG. 1 is an exploded perspective view schematically illustrating a liquid crystal display device in accordance with one exemplary embodiment.

Reference will now be made in detail to the exemplary embodiments, examples of which are illustrated in the accompanying drawings, wherein like reference numerals refer to like elements throughout. Expressions such as "at least one of," when preceding a list of elements, modify the entire list and not the individual elements of the list.

Figure 2:
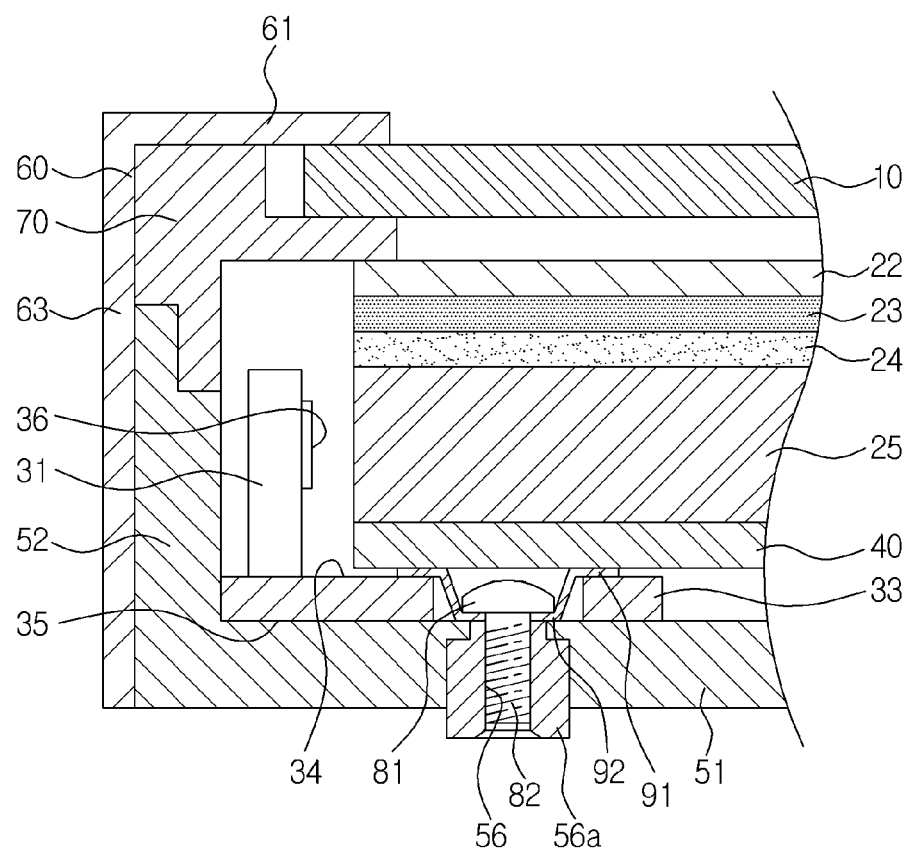
FIG. 2 is a cross-sectional view illustrating an assembly state of the liquid crystal display device in accordance with the exemplary embodiment.

FIG. 1 is an exploded perspective view schematically illustrating a liquid crystal display device in accordance with one exemplary embodiment and FIG. 2 is a cross-sectional view illustrating an assembly state of the liquid crystal display device in accordance with the exemplary embodiment.

As shown in FIGS. 1 and 2, the liquid crystal display device in accordance with this exemplary embodiment includes a liquid crystal display panel 10, a liquid crystal display module 20 located at the rear of the liquid crystal display panel 10, a middle mold 70 to support the liquid crystal display panel 10 and the liquid crystal display module 20 such that the liquid crystal display panel 10 and the liquid crystal display module 20 are separated from each other, and a top chassis 60 and a bottom chassis 50 respectively disposed on the upper and lower surfaces of the liquid crystal display panel 10 and the liquid crystal display module 20.

The top chassis 60 includes a bezel part 61 surrounding the edge of the liquid crystal display panel 10 and a side part 63 bent from the end of the bezel part 61.

The bezel part 61 denotes a width from the outer line of the liquid crystal display panel 10 to an active area in which an image is displayed.

The liquid crystal display panel 10 includes a thin film transistor substrate 11 on which thin film transistors are formed, a color filter substrate 13 facing the thin film transistor substrate 11, and a liquid crystal layer (not shown) provided between the thin film transistor substrate 11 and the color filter substrate 13.

A drive unit 15 to apply a drive signal is provided at one side of the thin film transistor substrate 11.

The drive unit 15 includes flexible printed circuit boards (FPCBs) 16, drive chips 17 mounted on the FPCBs 16, and circuit boards 18 connected to the FPCBs 16.

The drive unit 15 is formed in a chip on film (COF) type, but may be formed in other known types, such as a tape carrier package (TCP) type and a chip on glass (COG) type. Further, the drive unit 15 may be mounted on the thin film transistor substrate 11.

The liquid crystal display panel 10 adjusts alignment of the liquid crystal layer, thereby displaying an image. However, the liquid crystal display panel 10 is a non-emissive element, and thus receives light from the liquid crystal display module 20 located on the rear surface of the liquid crystal display panel 10.

The liquid crystal display module 20 includes a plurality of optical sheets 21 located under the liquid crystal display panel 10, a light guide unit 25 located under the optical sheets 21, light source units 30 to supply light to the light guide plate 25, and a reflective unit 40 located on the lower surface of the light guide unit 25.

The optical sheets 21 include a protective film 22, prism films 23 and a diffusion film 24.

The diffusion film 24 is formed by applying a bead-shaped coating layer to a base film so as to diffuse light from the light guide unit 25 and then to supply the diffused light to the liquid crystal display panel 10.

Each of the prism films 23 is provided with trigonal prisms formed in a designated alignment on the upper surface thereof so as to converge the light diffused by the diffusion film 24 in a direction vertical to the flat surface of the upper liquid crystal display panel 10.

Two prism films 23 are generally used, and the micro prisms formed on the respective prism films 23 form a designated angle.

Most of the light having passed through the prism films 23 progresses in the vertical direction, thereby providing uniform brightness distribution.

The protective film 22 is located on the prism films 23 and serves to protect the prism films 23 sensitive to scratches due to dust.

The light guide unit 25 is made of an acryl-based resin such as polymethylmethacrylate (PMMA), or polymethyl styrene (PMS, methylmethacrylate-styrene copolymer), and serves to uniformly supply light from the light source units 30 to the diffusion film 24.

The light guide unit 25 includes incident planes 26 provided on side surfaces of the light guide unit 25 such that light emitted from the light source units 30 is incident upon the incident planes 26, a light emitting plane 27 facing the diffusion film 24, and a reflective plane (not show) provided opposite to the light emitting plane 27.

The reflective unit 40 is located under the light guide unit 25 and serves to reflect light progressing downwards back to the light guide unit 25.

The reflective unit 40 may be made of a plastic material such as polyethylene terephthalate (PET) or polycarbonate (PC).

Each of the light source units 30 includes a plurality of light emitting diodes 31 to emit light, and a printed circuit board 33 on which the plurality of light emitting diodes 31 is mounted and a conductive pattern to apply electrical signals to the plurality of light emitting diodes 31 is formed.

The plurality of light emitting diodes 31 may include a plurality of white light emitting diodes to emit white light or a combination of light emitting diodes to respectively emit red, green and blue light.

These light emitting diodes 31 are disposed to be vertical with respect to the surface of the printed circuit board 33 so as to irradiate light onto the incident plane 26 of the light guide unit 25.

That is, light emitting planes 36 of the light emitting diodes 31 to emit light are disposed to be vertical with respect to the upper surface of the printed circuit board 33, and thus face the incident plane 26 of the light guide unit 25.

The printed circuit board 33 may be a metal printed circuit board (PCB) made of a material having high thermal conductivity, such as silicon steel, galvanized steel and aluminum, or be a FPCB.

Each of the printed circuit boards 33 has a distance in the lengthwise direction corresponding to a distance of the incident plane 26 of the light guide unit 25 and a distance extended in the widthwise direction which is perpendicular to the lengthwise direction, i.e., an irradiation direction of the light emitting diodes 31, thus being formed in a rectangular shape having a designated thickness.

The printed circuit boards 33 serve to transmit light generated by the light emitting diodes 31 to the outside as well as to supply drive signals to the light emitting diodes 31.

For this purpose, rear surfaces 35 of the printed circuit boards 33 made of a material having high thermal conductivity contact a lower surface 51 of the bottom chassis 50 and thus rapidly transmit the heat generated by the light emitting diodes 31 to the bottom chassis 50.

The bottom chassis 50 includes the lower surface 51 on which the liquid crystal display module 20 is seated and side surfaces 52 extended upwardly from the edge of the lower surface 51.

Such a bottom chassis 50 is made of a thermal conductive metal and transmits heat generated by the light source units 30 to the outside.

That is, the rear surfaces 35 of the printed circuit boards 33 contact the lower surface 51 of the bottom chassis 50, thereby improving a heat dissipation effect due to increase in a contact area.

Although not shown in the drawings, at least one of various circuit boards to drive the liquid crystal display device may be installed on the rear surface of the bottom chassis 50. That is, when the liquid crystal display device in accordance with the exemplary embodiment is applied to a broadcast signal receiver (e.g., a TV), a power circuit board and a main circuit board on which various necessary signal processing connectors and signal processing ICs are mounted may be screw-connected to the rear surface of the bottom chassis 50. Further, the drive unit 15 of the liquid crystal display panel 10 may be fixed to the edge of the rear surface of the bottom chassis 50.

Further, a connector 37 to supply power to the light emitting diodes 31 is provided on the printed circuit board 33.

The connector 37 is electrically connected to a drive printed circuit board (not shown) installed on the rear surface of the bottom chassis 50 so as to apply drive power to the light emitting diodes 31. In this exemplary embodiment, the connector 37 is protruded from the rear surface 35 of the printed circuit board 33 and passes through a connector hole 57 formed on the lower surface 51 of the bottom chassis 50.

The connector 37 having passed through the connector hole 57 may be connected to a connector provided at the end of a wire electrically connected to the drive board.

The light emitting diodes 31 are disposed at a position adjacent to the edge of one side of the printed circuit board 33. That is, the light emitting diodes 31 are disposed at a position, which is offset from or eccentric to one side on an upper surface 34 of the printed circuit board 33, and if the light source units 30 are installed on the bottom chassis 50, the light emitting diodes 31 are disposed adjacent to and to the inside of the side surface 52 of the bottom chassis 50.

In this case, a part of the length W extended in the widthwise direction of the printed circuit board 33 is overlapped by the lower end of the reflective unit 40.

Through such a configuration, the width of the bezel part 61 of the top chassis 60 surrounding the edge of the liquid crystal display panel 10 is greatly reduced, and thus immersion into a screen is enhanced and the screen looks lager.

Although this exemplary embodiment illustrates four light source units 30 disposed adjacent to four side surfaces of the light guide unit 25, two light source units 30 disposed adjacent to two opposite side surfaces of the light guide unit 25 or one light source unit 30 disposed adjacent to one side surface of the light guide unit 25 may be provided.

The printed circuit boards 33 of these light source units 30 may be fixed to an inner part 51a of the lower surface 51 of the bottom chassis 50 through fastening members 80, such as screws.

Figure 3:
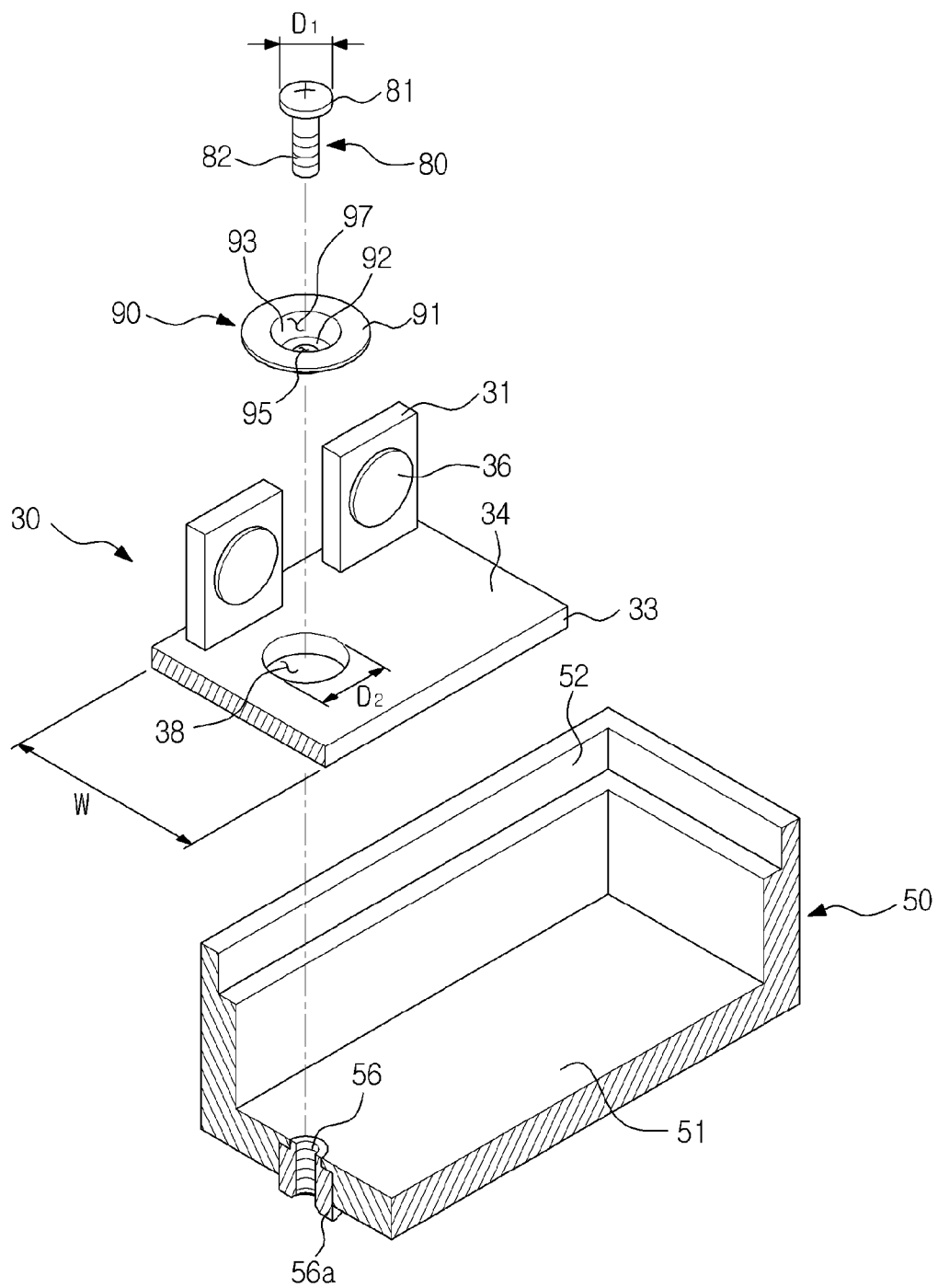
FIG. 3 is an exploded perspective view illustrating the connection relation between a bottom chassis and a light source unit in accordance with the exemplary embodiment.
Figure 4:
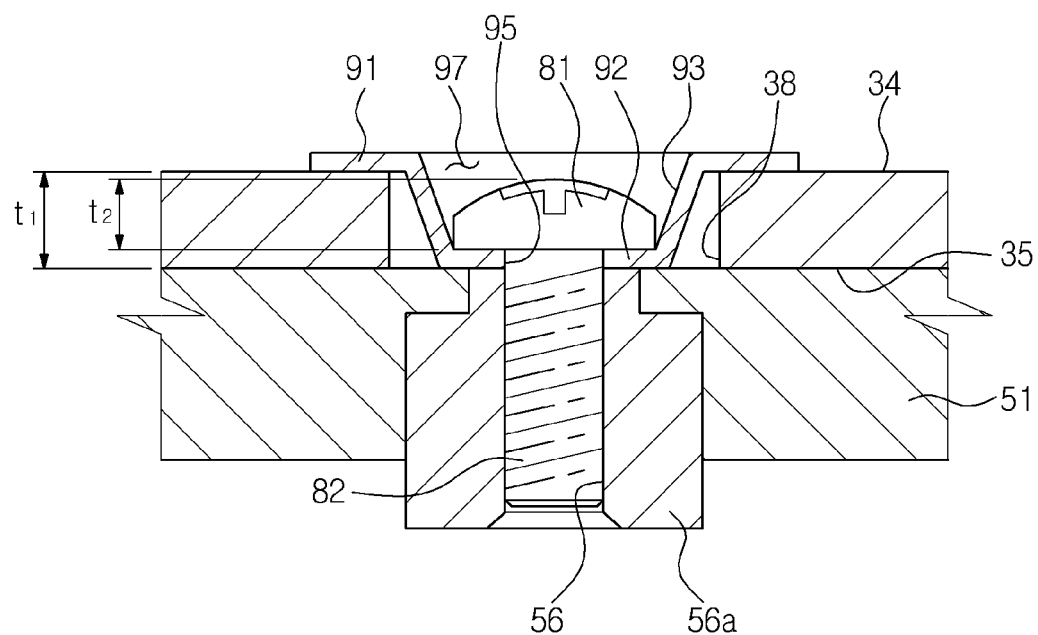
FIG. 4 is a cross-sectional view illustrating a connection state of the light source unit to the bottom chassis in accordance with the exemplary embodiment.

FIG. 3 is an exploded perspective view illustrating the connection relation between the bottom chassis and the light source unit in accordance with the exemplary embodiment and FIG. 4 is a cross-sectional view illustrating a connection state of the light source unit to the bottom chassis in accordance with the exemplary embodiment.

With reference to FIGS. 3 and 4, the printed circuit board 33 is seated on the lower surface 51 of the bottom chassis 50 through the fastening members 80 such that the light emitting diodes 31 of the light source unit 30 are disposed at a position adjacent to the side surface 52 of the bottom chassis 50.

A plurality of opening holes 38 is vertically formed through the printed circuit board 33 so that a plurality of fastening members 80 is respectively inserted into the plurality of opening holes 38, and a plurality of fastening holes 56 is provided on the lower surface 51 of the bottom chassis 50 at positions corresponding to the plurality of opening holes 38 so that the plurality of fastening members 80 is respectively fastened into the plurality of fastening holes 56.

Each of the plurality of fastening holes 56 is provided with a female fastening part 56a having a screw thread formed on the inner surface thereof so as to have greater rigidity than the lower surface 51 to maintain fastening force of the fastening member 80.

Each of the plurality fastening members 80 includes a head part 81 inserted into the opening hole 38 and a male fastening part 82, or screw part, fastened into the fastening hole 56, i.e., disposed in and affixed to the fastening hold 56.

The head part 81 may have a thickness t2 smaller than a thickness t1 of the printed circuit board 33 so as not to be protruded outwardly from the upper surface 34 of the printed circuit board 33 when the head part 81 is inserted into the opening hole 38.

Further, the head part 81 may have a diameter D1 smaller than a diameter D2 of the opening hole 38 so as to be inserted into the opening hole 38.

These fastening members 80 fix the printed circuit board 33 to the bottom chassis 50 via support members 90.

Each of the support members 90 includes a board support part 91 having a diameter greater than the diameter D2 of the opening hole 38, and a head support part 92 having a height difference with the board support part 91 and a diameter smaller than the diameter D2 of the opening hole 38.

The height difference between the board support part 91 and the head support part 92 may be equal to or slightly smaller than the thickness t1 of the printed circuit board 33.

The board support part 91 and the head support part 92 are interconnected by a connection part 93, and a receipt part 97 to receive the head part 81 of the fastening member 80 is formed within the support member 90.

The receipt part 97 has a circular cross section. The receipt part 97 may be formed in a cylindrical shape, a diameter of which is uniform throughout upper and lower portions of the receipt part 97, or in a tapered shape, a diameter of which is gradually decreased in a downward direction.

The board support part 91 is supported by the upper surface 34 of the printed circuit board 33, and the head support part 92 is supported by the lower surface 51 of the bottom chassis 50. Each of the board support part 91 and the head support part 92 has a circular cross section, but may have any shape which may be supported by the printed circuit board 33 and the lower surface 51 of the bottom chassis 50. Further, the board support part 91 has a thin thickness and is flat so as not to interfere with structures mounted on the upper surface of the board support part 91.

A through hole 95 through which the screw part 82 of the fastening member 80 passes is formed through the center of the head support part 92.

Through such a configuration, the printed circuit boards 33 may be fixed to the bottom chassis 50 by the fastening members 80 via the support members 90.

That is, when the screw parts 82 of the fastening members 80 are inserted and fastened into the through holes 95 and the fastening holes 56 after the support members 90 are inserted into the opening holes 38 of the printed circuit boards 33, the head support parts 92 are interposed between the lower surface 51 of the bottom chassis 50 and the head parts 81 of the fastening members 80 and the board support parts 91 apply pressure to the upper surfaces 34 of the printed circuit boards 33. Thereby, the printed circuit boards 33 are fixed under the condition that the rear surfaces 35 of the printed circuit boards 33 contact the lower surface 51 of the bottom chassis 50.

Here, since the head parts 81 of the fastening members 80 are received in the receipt parts 97 of the support members 90 and thus are not protruded from the upper surfaces 34 of the printed circuit boards 33, generation of damage to the light guide unit or the optical sheets seated on the upper surfaces 34 of the printed circuit boards 33 in accordance with this exemplary embodiment due to pressure of the head parts 81 may be prevented.

Figure 5:
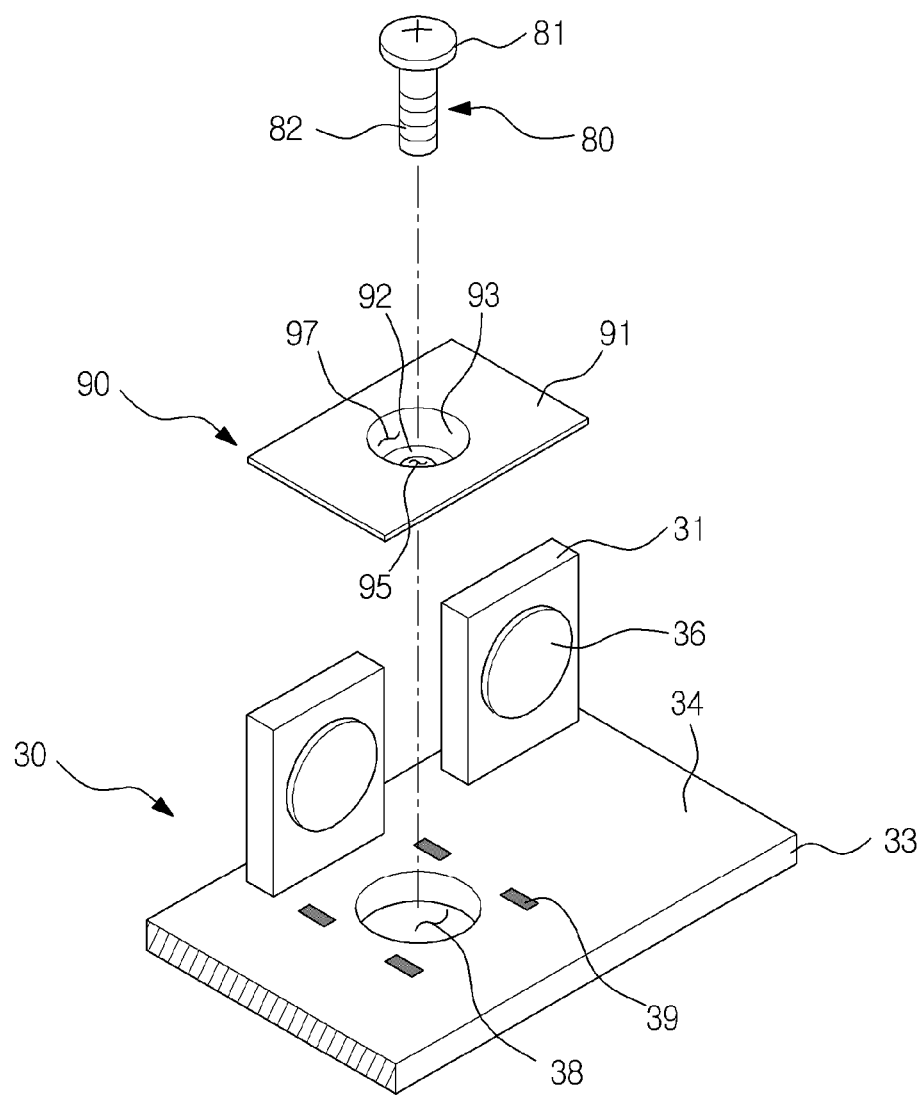
FIG. 5 is an exploded perspective view illustrating the connection relation between a bottom chassis and a light source unit in accordance with another exemplary embodiment.
Figure 6:
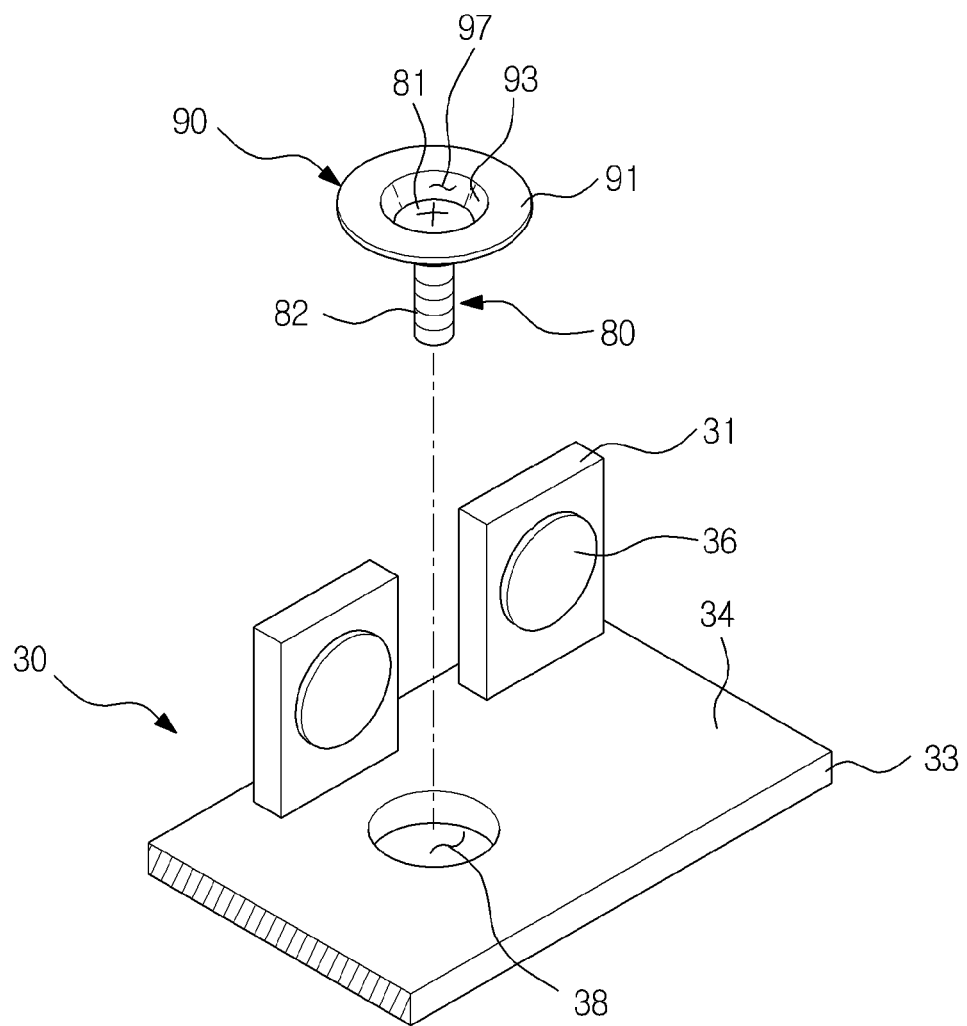
FIG. 6 is an exploded perspective view illustrating the connection relation between a bottom chassis and a light source unit in accordance with a further exemplary embodiment.

Although this exemplary embodiment illustrates the support members 90 and the fastening members 80 as being separately provided so as to fix the printed circuit boards 33 to the lower surface 51 of the bottom chassis 50, the support members 90 may be provided integrally with the printed circuit boards 33, as shown in FIG. 5, or may be provided integrally with the fastening members 80, as shown in FIG. 6, so as to reduce manual labor to facilitate workability.

If the support members 90 are formed integrally with the printed circuit board 33, land parts 39 to fix the support members 90 are provided on the upper surface 34 of the printed circuit board 33 at positions adjacent to the opening holes 38, thereby allowing the support members 90 to be soldered to the printed circuit boards 33 through a surface mount technology (SMT) process.

As is apparent from the above description, a liquid crystal display module and a liquid crystal display device having the same in accordance with exemplary embodiments improve reliability.

Although a few exemplary embodiments have been shown and described, it would be appreciated by those skilled in the art that changes may be made in these exemplary embodiments without departing from the principles and spirit of the inventive concept, the scope of which is defined in the claims and their equivalents.

What is claimed is:

1. A liquid crystal display module comprising:
   a bottom chassis comprising a lower surface including at least one fastening hole disposed along a first direction;
   a printed circuit board comprising a first surface supported by the lower surface of the bottom chassis, a second surface opposite to the first surface, and at least one opening hole corresponding to the at least one fastening hole of the bottom chassis;
   a plurality of light emitting diodes mounted on the second surface of the printed circuit board; and
   at least one fastening member comprising a head part inserted into the at least one opening hole of the printed circuit board so as not to be protruded outwardly from the second surface of the printed circuit board, and a fastening part disposed in and affixed to the at least one fastening hole.

2. The liquid crystal display module according to claim 1, further comprising: at least one support member comprising a board support part supported by the second surface of the printed circuit board at a position adjacent to the at least one opening hole, and a head support part extended from the board support part, the head support part interposed between the head part of the at least one fastening member and the lower surface of the bottom chassis, the at least one support member comprising at least one through hole through which the fastening part passes,
   wherein the board support part applies pressure to the second surface of the printed circuit board by the at least one fastening member to fix the printed circuit board to the lower surface of the bottom chassis.

3. The liquid crystal display module according to claim 1, wherein the plurality of light emitting diodes comprise a plurality of light emitting planes disposed vertically with respect to the second surface of the printed circuit board and which irradiate light in a second direction perpendicular to the first direction and parallel to the lower surface of the bottom chassis.

4. The liquid crystal display module according to claim 3, further comprising a light guide unit to guide light emitted from the light emitting parts,
   wherein the at least one opening hole is disposed below the light guide unit.

5. The liquid crystal display module according to claim 4, wherein the bottom chassis comprises a plurality of side surfaces and the plurality of light emitting diodes is disposed adjacent to the side surfaces of the bottom chassis.

6. The liquid crystal display module according to claim 2, wherein the board support part and the head support part of the at least one support member are spaced from one another in the first direction and a receipt part to receive the head part is formed within the at least one support member.

7. The liquid crystal display module according to claim 6, wherein a height of the receipt part corresponds to a thickness of the printed circuit board.

8. The liquid crystal display module according to claim 6, wherein the board support part has a first diameter, the head support part has a second diameter smaller than the first diameter, and a connection part to form the inner wall of the receipt part is formed in a tapered shape, wherein a diameter of the connection part is decreased in a downward direction along the first direction.

9. The liquid crystal display module according to claim 2, wherein the at least one support member is fixed to the printed circuit board so as to be integral with the printed circuit board.

10. The liquid crystal display module according to claim 9, wherein the board support part is soldered to the second surface of the printed circuit board.

11. The liquid crystal display module according to claim 2, wherein the at least one support member is fixed to the at least one fastening member so as to be integral with the at least one fastening member.

12. The liquid crystal display module according to claim 1, further comprising a connector protruded from the first surface of the printed circuit board to supply power to the plurality of light emitting diodes,
    wherein a connector hole corresponding to the connector is formed on the lower surface of the bottom chassis.

13. A liquid crystal display device comprising:
    a liquid crystal display panel;
    a light guide unit which guides light to the liquid crystal display panel;
    a bottom chassis comprising a lower surface supporting the light guide unit and comprising at least one fastening hole disposed along a first direction;
    a printed circuit board comprising a first surface supported by the lower surface of the bottom chassis, a second surface opposite to the first surface, and at least one opening hole corresponding to the at least one fastening hole the printed circuit board disposed between the light guide unit and the bottom chassis;
    a plurality of light emitting diodes mounted on the printed circuit board; and
    at least one fastening member comprising a head part inserted into the at least one opening hole of the printed circuit board so as to not protrude outwardly from the second surface of the printed circuit board, and a fastening part disposed in and affixed to the at least one fastening hole.

14. The liquid crystal display device according to claim 13, further comprising: at least one support member comprising a receipt part inserted into the at least one opening hole, a board support part extended outwardly from an upper end of the receipt part, and a head support part extended inwardly from a lower end of the receipt part, the at least one support member comprising at least one through hole through which the fastening part passes,
    wherein the board support part applies pressure to the second surface of the printed circuit board by the at least one fastening member to fix the printed circuit board to the lower surface of the bottom chassis.

15. The liquid crystal display device according to claim 14, wherein the at least one support member is fixed to the printed circuit board so as to be integral with the printed circuit board.

16. The liquid crystal display device according to claim 14, wherein the board support part is soldered to the second surface of the printed circuit board.

17. The liquid crystal display device according to claim 14, wherein the at least one support member is fixed to the at least one fastening member so as to be integral with the at least one fastening member.

18. The liquid crystal display device according to claim 14, wherein the board support part has a first diameter, the head support part has a second diameter smaller than the first diameter, and a connection part to form the inner wall of the receipt part is formed in a tapered shape, wherein a diameter of the connection part is decreased in a downward direction along the first direction.

19. The liquid crystal display device according to claim 13, wherein a height of the receipt part corresponds to a thickness of the printed circuit board.

20. The liquid crystal display device according to claim 13, wherein the plurality of light emitting diodes comprise a plurality of light emitting planes disposed vertically with respect to the second surface of the printed circuit board and which irradiate light onto at least one side surface of the light guide unit.

21. The liquid crystal display device according to claim 20, wherein the bottom chassis comprises a plurality of side surfaces and the plurality of light emitting diodes is disposed adjacent to the side surfaces of the bottom chassis.

22. The liquid crystal display device according to claim 13, further comprising a connector protruded from the first surface of the printed circuit board to supply power to the plurality of light emitting diodes,
wherein a connector hole corresponding to the connector is formed on the lower surface of the bottom chassis.

23. The liquid crystal display device according to claim 13, further comprising a reflective unit disposed on the lower end of the light guide unit,
wherein the reflective unit is disposed on the lower surface of the bottom chassis and covers the at least one opening hole.

24. A liquid crystal display module comprising:
a bottom chassis comprising a lower surface including at least one fastening hole disposed along a first direction;
a printed circuit board comprising a first surface supported by the lower surface of the bottom chassis, a second surface opposite to the first surface, and at least one opening hole corresponding to the at least one fastening hole;
a plurality of light emitting diodes mounted on the second surface of the printed circuit board;
at least one fastening member comprising a head part inserted into the at least one opening hole of the printed circuit board, and a fastening part disposed in and affixed to the at least one fastening hole,
wherein the head part does not protrude upwardly from the printed circuit board when the at least fastening member is disposed in the at least one fastening hole.

25. The liquid crystal display module according to claim 24, further comprising:
at least one support member comprising a receipt part inserted into the at least one opening hole to receive the head part, and a board support part supported by the second surface of the printed circuit board,
wherein the board support part is configured to apply pressure to the printed circuit board by fastening force of the at least one fastening member to fix the printed circuit board to the lower surface of the bottom chassis.

26. A liquid crystal display device comprising:
a liquid crystal display panel;
a light guide unit configured to guide light to the liquid crystal display panel;
a bottom chassis supporting the light guide unit and comprising a lower surface including at least one fastening hole disposed along a first direction;
a printed circuit board comprising a first surface supported by the lower surface of the bottom chassis, a second surface opposite to the first surface, and at least one opening hole corresponding to the at least one fastening hole of the bottom chassis;
a plurality of light emitting diodes mounted on the second surface of the printed circuit board and positioned outside of the at least one fastening hole;
a reflective unit disposed between the light guide unit and the printed circuit board and overlapping the at least one opening hole; and
at least one fastening member comprising a head part inserted into the at least one opening hole of the printed circuit board so as not to protrude outwardly from the second surface of the printed circuit board, and a fastening part disposed in and affixed to the at least one fastening hole.

27. The liquid crystal display device of claim 26, further comprising:
at least one support member comprising a board support part supported by the second surface of the printed circuit board at a position adjacent to the at least one opening hole, and a head support part extended from the board support part, the head support part interposed between the head part of the at least one fastening member and the lower surface of the bottom chassis, the at least one support member comprising at least one through hole through which the fastening part passes.

* * * * *